(No Model.) 2 Sheets—Sheet 1.

E. L. KNIGHT.

WATER CLOSET VALVE.

No. 11,029. Reissued Sept. 3, 1889.

Witnesses:
E. P. Ellis
J. M. Nesbit.

Inventor:
Edwin L. Knight,
per
F. A. Lehmann,
Att'y.

N. PETERS, Photo-Lithographer, Washington, D. C.

(No Model.) 2 Sheets—Sheet 2.

E. L. KNIGHT.

WATER CLOSET VALVE.

No. 11,029. Reissued Sept. 3, 1889.

Witnesses:

E. P. Ellis,

J. M. Nesbit.

Inventor:

Edwin L. Knight, per F. A. Lehmann,

Att'y.

N. PETERS, Photo-Lithographer, Washington, D. C.

UNITED STATES PATENT OFFICE.

EDWIN L. KNIGHT, OF SPRINGFIELD, MASSACHUSETTS.

WATER-CLOSET VALVE.

SPECIFICATION forming part of Reissued Letters Patent No. 11,029, dated September 3, 1889.

Original No. 399,905, dated March 19, 1889. Application for reissue filed June 28, 1889. Serial No. 315,939.

*To all whom it may concern:*

Be it known that I, EDWIN L. KNIGHT, a citizen of the United States, residing at Springfield, in the county of Hampden and State of Massachusetts, have invented new and useful Improvements in Water-Closet Valves, of which the following is a specification.

This invention relates to that class of water-closet valves which are adapted for insuring, on being once lifted from their seats, a primary and extensive flush of water through the service-pipe, and also a supplemental and less extensive flush after said primary flush has ceased; and the invention consists in the construction and combination of the various parts, all substantially as will hereinafter more fully appear, and be set forth in the claims.

Figure 1:
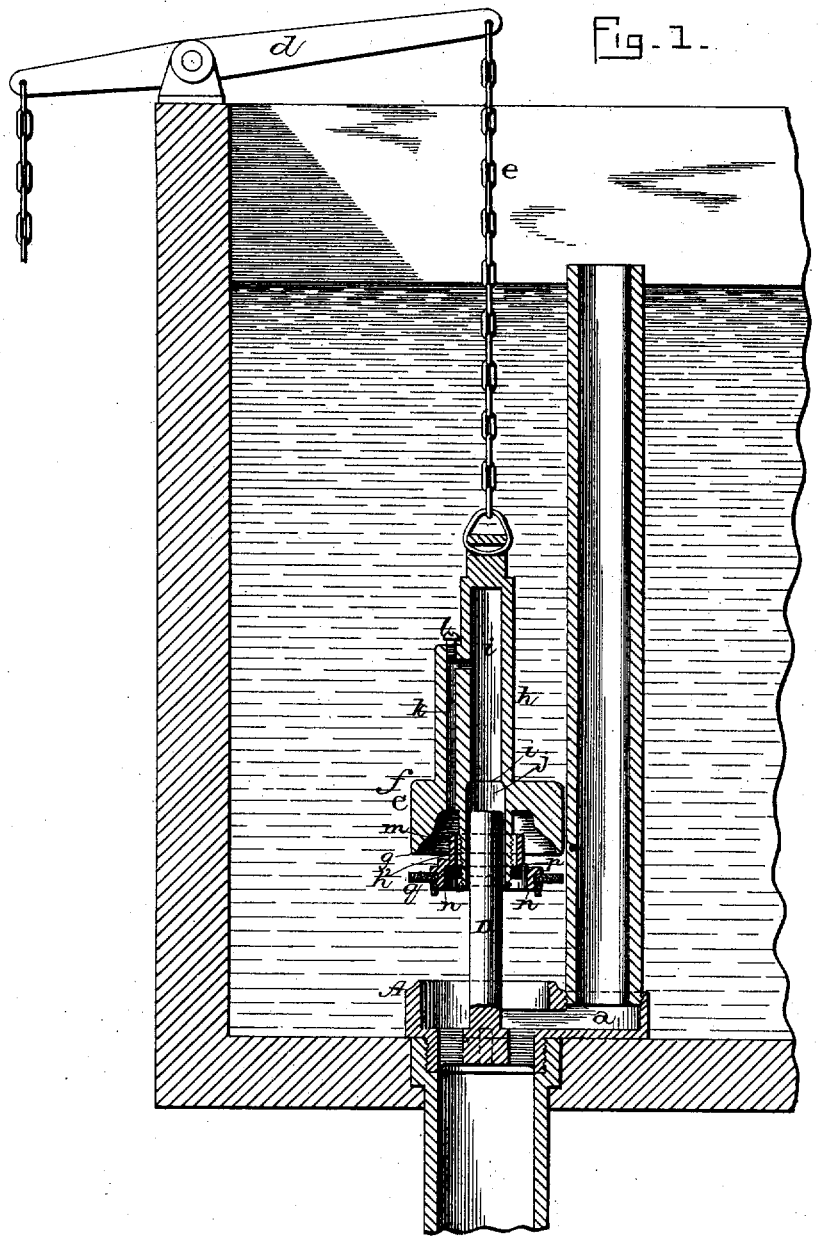
Figure 2:
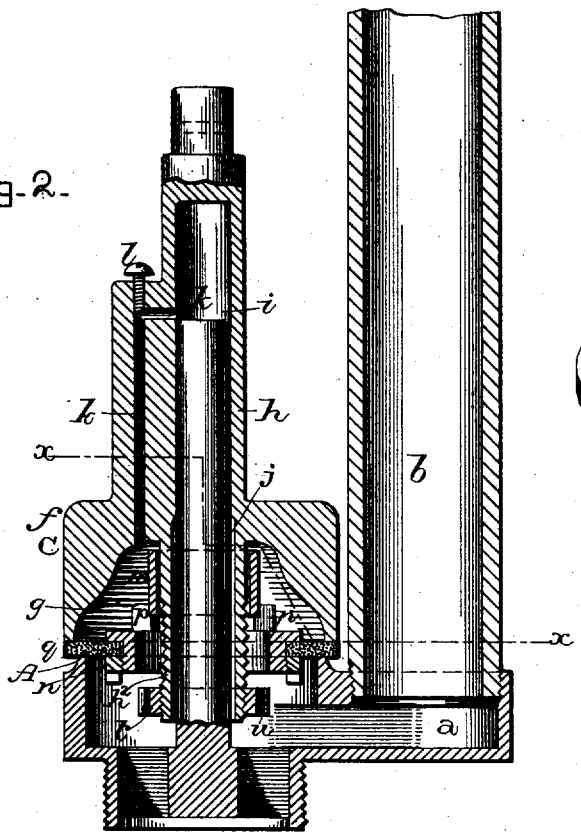
Figure 4:
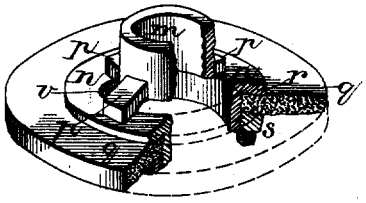
Figure 5:
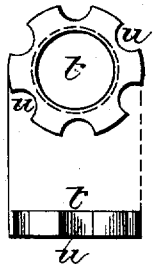
Figure 3:
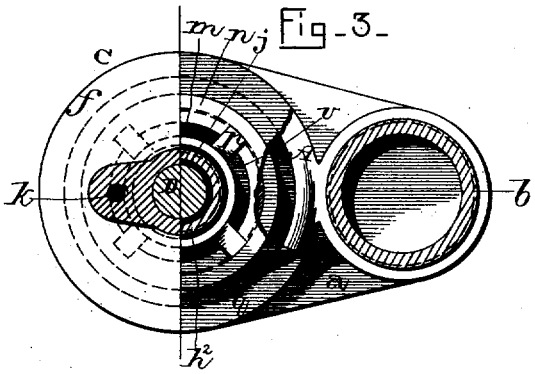

In the accompanying drawings my improved valve is illustrated, similar letters of reference therein indicating corresponding parts in all the views, and Figure 1 is a central vertical section of the valve as applied for operation in a tank, the said valve being shown in a position as just raised from its seat to its full height and ready to close. Fig. 2 is a section of the valve similar to Fig. 1, but drawn about full size and shown as closed. Fig. 3 is a horizontal section of the valve, taken on the planes indicated by the line $x\ x$, Fig. 2. Fig. 4 is a perspective view in detail, partly broken away for better illustration of a part of the valve hereinaffer referred to; and Fig. 5 is a plan and projection thereof of an abutment-nut, hereinafter referred to.

In the drawings, A represents the valve-seat located in the bottom of the tank B, to which the service-pipe is to be attached, and a lateral hollow extension $a$ is integrally formed with said valve-seat for the overflow-pipe $b$, as usual.

C represents the valve, and $d$ and $e$ the lever and chain connection for its operation. The valve is formed in two parts, the upper member of which comprises a cylindrical body $f$, having in its bottom an upwardly-flaring chamber $g$ and an upwardly-extended axial spindle $h$, which spindle is also downwardly projected a short distance in an extension $h^2$ below the plane of the bottom of said cylindrical body, and the lower member is essentially a disk for directly covering the valve-seat, movable longitudinally within given limits on said extension and having vertical openings therethrough. The said spindle from its lower extremity to within a short distance from its upper end is hollow, the bore thereof for the greater portion of its length from its upper end being of a diameter, as at $i$, to fit the guiding-spindle D, which is supported in the axial line of and from the valve-seat casting in the manner usual in valves of this class, and from the lower end of said spindle its bore is of slightly increased diameter, as seen at $j$. In the side wall of said spindle is a lateral and downwardly-extended passage $k$, leading from the part $i$ of the spindle-bore to the flaring lower chamber $g$, the walls of the spindle at one side being laterally distended to afford sufficient stock within which the said passage may be formed, and an adjusting-screw $l$ is provided for a regulating impediment to the passage of water through said passage, as will hereinafter appear.

The lower member of the valve comprises a sleeve $m$ for loosely surrounding the spindle-extension $h^2$, and a collar $n$ concentric therewith and supported therefrom by radial arms $p$, and preferably in a lower plane than said sleeve, with openings between them, and said collar of itself having its perimeter sufficiently extended or being provided with a supplemental part, as a washer $q$, of leather or other compressible material, is, in the operation of the valve, to directly rest upon the valve-seat, closing the passage thereof. As shown, the attachment of the washer to the said collar is by forming a peripheral flange $r$ on the upper edge of the collar, the periphery of the collar below said flange being screw-threaded for receiving a nut $s$, between which and the said flange the washer is bound.

A lifting-abutment $t$ is provided on the lower end portion of the spindle for the purpose, after the upper member of the valve has been raised a certain distance by the lever, of also lifting the lower member from its seat, and said lifting-abutment is to be preferably adjustable longitudinally of said lower spindle-extension, whereby the degree of separation of the members of the valve at the time of its being lifted may be varied, a simple and practical method of securing such adjustable feature being by forming screw-threads on the spindle-extension $h^2$ and tapping the said abutment $t$. The said lifting-abutment $t$ is to be recessed, as at $u$, or perforated, so that at no time under any position thereof in the operation of the valve relative to the opening $v$ between the sleeve $m$ and collar $n$ will said opening be closed.

The operation of the valve described is as follows: Assuming the same to be closed, as in Fig. 2, on operating the lever the upper member of the valve is raised a short distance before its lifting-abutment $t$ comes in contact with the lower member, as by striking against the radial arms $p$ thereof, when the latter is also raised from the valve-seat, permitting the large flow of water, and it will be observed, Fig. 1, that the valve has been lifted, so that the part of the spindle-bore $i$ of less diameter is entirely above the upper end of the guiding-stem D, whereby the spindle-bore may be filled with water. As the valve, under its weight and aided by the water-pressure from above, settles, the valve-seat A is soon covered by the lower member of the valve, and the major flush ceases, but the minor flush continues, water flowing from the tank through the opening $v$ between said sleeve $m$ and collar $n$ until the upper member of the valve descends and its body $f$ rests upon the washer $q$, when the latter flush ceases. The water in the spindle-bore forms a resistance or cushion, being expelled only through the passage $k$, and therefore the minor flush will be of considerable duration, the extent of which may be regulated by the screw $l$ on the one hand and on the other by the distance the lifting-abutment $t$ is normally placed from the under contacting side of the lower member of the valve, and said abutment may be, if desired, screwed up against the arms $p$, and in that event but one wash will be secured from one raising of the valve.

What I claim as my invention is—

1. In a water-closet valve, the combination of an upper weighted member to which the lifting-chain is attached, with the lower member loosely connected thereto and having a vertical play independently of the upper member and provided with an opening through which the minor flush of water passes, and the valve-seat upon which the lower member first closes, substantially as shown.

2. In a water-closet valve, the combination of the upper weighted member provided with a lifting device at its lower end and the lifting-chain attached to it at its upper end, with the lower perforated vertically-moving member which has an independent vertical play or movement of its own and which is raised by the lifting device, the valve-seat, and a means for retarding the closing of the upper weighted member after the lower perforated member has become seated upon the valve-seat, substantially as specified.

3. The combination, with a valve-seat and a guiding-spindle supported therefrom, of a valve comprising two members, the upper of which consists of a body and an upwardly and downwardly projected hollow spindle open from its bottom, the bore of which is of two diameters, substantially as described, and having a laterally and downwardly extending passage $k$, and a lifting-abutment $t$ on said lower spindle-extension, and the lower member consisting, essentially, of an open-work disk adapted for a vertical movement with relation to said lower spindle-extension, substantially as described.

4. The combination, with a valve-seat and a guiding-spindle supported therefrom, of a valve comprising two members, the upper of which consists of a body and an upwardly and downwardly projected hollow spindle open from its bottom, the bore of which is of two diameters, substantially as described, and having a laterally and downwardly extending passage $k$, and a lifting-abutment $t$, vertically adjustable on said lower spindle-extension, and the lower member consisting, essentially, of an open-work disk adapted for a vertical movement with relation to said lower spindle-extension, substantially as described.

5. The combination, with a valve-seat and a guiding-spindle supported therefrom, of a valve comprising two members, the upper of which consists of a body and an upwardly and downwardly projected hollow spindle open from its bottom, the bore of which is of two diameters, substantially as described, and having a laterally and downwardly extending passage $k$, and a regulating-screw therefor, and a lifting-abutment $t$ on said lower spindle-extension, and the lower member consisting, essentially, of an open-work disk adapted for a vertical movement with relation to said lower spindle-extension, substantially as described.

6. The combination, with the valve-seat and a guiding-spindle supported therefrom, of a valve comprising two members, the upper of which consists of a cylindrical body recessed on its under side having an upwardly and downwardly projected hollow spindle, the bore of which is of two diameters, substantially as described, and having a lateral and downwardly-extending passage $k$, and the lower extension of the spindle screw-threaded and provided with an apertured abutment-nut $t$, and the lower member consisting of a sleeve, a concentric collar, and radial connecting-arms $p$, and the said collar provided with a washer $q$, attached at and extending outwardly from its edge, substantially as and for the purpose described.

7. The combination, with the valve-seat and a guiding-spindle supported therefrom, of a valve comprising two members, the upper of which consists of a cylindrical body $f$, recessed on its under side, and an upwardly and downwardly projected hollow spindle open from its bottom, the bore of which is of two diameters, substantially as described, and having a lateral and downwardly-extending passage, and an adjusting-screw therefor, and provided with the apertured adjustable abutment-nut *t*, and the lower member consisting of the sleeve *m*, the collar *n*, flanged and screw-threaded, and the connecting-arms *p*, and the washer *q*, and nut *s*, combined and operating substantially as and for the purpose described.

8. In a water-closet valve, the combination of the upper weighted vertically-moving member provided with a water-channel through it and having a lifting device secured thereto, the perforated lower member loosely attached to the upper one, and a guiding-spindle common to both members, substantially as specified.

9. In a water-closet valve, the combination of the upper weighted vertically-moving member, the lifting-chain attached to its upper end, the perforated valve or lower member loosely connected to and having an independent movement from the upper member, and a guiding-spindle extending from the valve-seat and which is common to both members, substantially as shown.

In testimony whereof I affix my signature in the presence of two witnesses.

EDWIN L. KNIGHT.

Witnesses:
GEORGE HOWLETT,
E. E. KNIGHT.